United States Patent
Chiruvolu et al.

(10) Patent No.: US 9,015,530 B2
(45) Date of Patent: Apr. 21, 2015

(54) RELIABLY TESTING VIRTUAL MACHINE FAILOVER USING DIFFERENCING DISKS

(76) Inventors: Phani Chiruvolu, Hyderabad (IN); Vinod Atal, Hyderabad (IN); Gaurav Sinha, Hyderabad (IN)

(*) Notice: Subject to any disclaimer, the term of this patent is extended or adjusted under 35 U.S.C. 154(b) by 303 days.

(21) Appl. No.: 13/532,832

(22) Filed: Jun. 26, 2012

(65) Prior Publication Data

US 2013/0346803 A1    Dec. 26, 2013

(51) Int. Cl.
*G06F 11/00* (2006.01)
*G06F 11/36* (2006.01)
*G06F 9/455* (2006.01)

(52) U.S. Cl.
CPC ........ *G06F 11/3688* (2013.01); *G06F 9/45533* (2013.01)

(58) Field of Classification Search
CPC . G06F 11/07; G06F 11/0706; G06F 11/0712; G06F 11/073; G06F 11/079; G06F 11/26; G06F 11/261; G06F 11/301; G06F 11/3037; G06F 11/3664
USPC .............. 714/4.11, 11, 13, 25, 28, 31, 33, 37, 714/38.1, 40, 41
See application file for complete search history.

(56) References Cited

U.S. PATENT DOCUMENTS

| | | | |
|---|---|---|---|
| 6,625,751 B1 * | 9/2003 | Starovic et al. | 714/11 |
| 6,691,250 B1 | 2/2004 | Chandiramani et al. | |
| 2007/0094659 A1 | 4/2007 | Singh et al. | |
| 2008/0133208 A1 * | 6/2008 | Stringham | 703/20 |
| 2009/0150885 A1 | 6/2009 | Safari et al. | |
| 2010/0138830 A1 | 6/2010 | Astete et al. | |
| 2011/0047548 A1 | 2/2011 | Traut | |
| 2011/0087874 A1 * | 4/2011 | Timashev et al. | 714/32 |
| 2012/0233123 A1 * | 9/2012 | Shisheng et al. | 707/639 |

OTHER PUBLICATIONS

"Protecting the Virtual Datacenter: Disaster Recovery Using Dell Equallogic PS Series Storage and VMWare VCenter Site Recovery Manager", Retrieved at <<http://en.community.dell.com/cfs-filesystemfile.ashx/_key/communityserver-components-postat-tachments/00-19-86-14-69/TR1039-v2.1-DR-using-PS-Series-and-vCenter-SRM.pdf>>, V. 2.1, Jun. 2010, pp. 44.

"Disaster Recovery with Eternus DX—The Data Safe—and VMWARE SRM", Retrieved at <<http://www.fujitsu.com/downloads/STRSYS/system/dx-vmware-srm.pdf>>, 2010, pp. 1-13.

(Continued)

*Primary Examiner* — Joseph D Manoskey
(74) *Attorney, Agent, or Firm* — John Jardine; Kate Drakos; Micky Minhas

(57) ABSTRACT

In one embodiment, a virtual machine replication system may test a replica data set while continuing to replicate a primary data set. A data storage 250 may store a replica data set for a replica virtual machine 302 to back up a primary data set for a primary virtual machine 304. The data storage 250 may preserve a test point in time 322 in the replica data set using a test differencing disk 344. A processor 220 may execute a test virtual machine 342 that performs a test operation on the test point in time 322 while the replica data set continues to replicate the primary data set.

20 Claims, 9 Drawing Sheets

(56) References Cited

OTHER PUBLICATIONS

Ruthruff, et al., "Running SQL Server with Hyper-V Dynamic Memory", Retrieved at <<http://download.microsoft.com/download/D/2/0/D20E1C5F-72EA-4505-9F26-FEF9550EFD44/Best%20Practices%20for%20Running%20SQL%20Server%20with%20HVDM.docx>>, Jul. 2011, pp. 23.

Chiruvolu, et al., "Managing Replicated Virtual Storage at Recovery Sites," U.S. Appl. No. 13/163,760, filed Jun. 20, 2011, pp. 45.

* cited by examiner

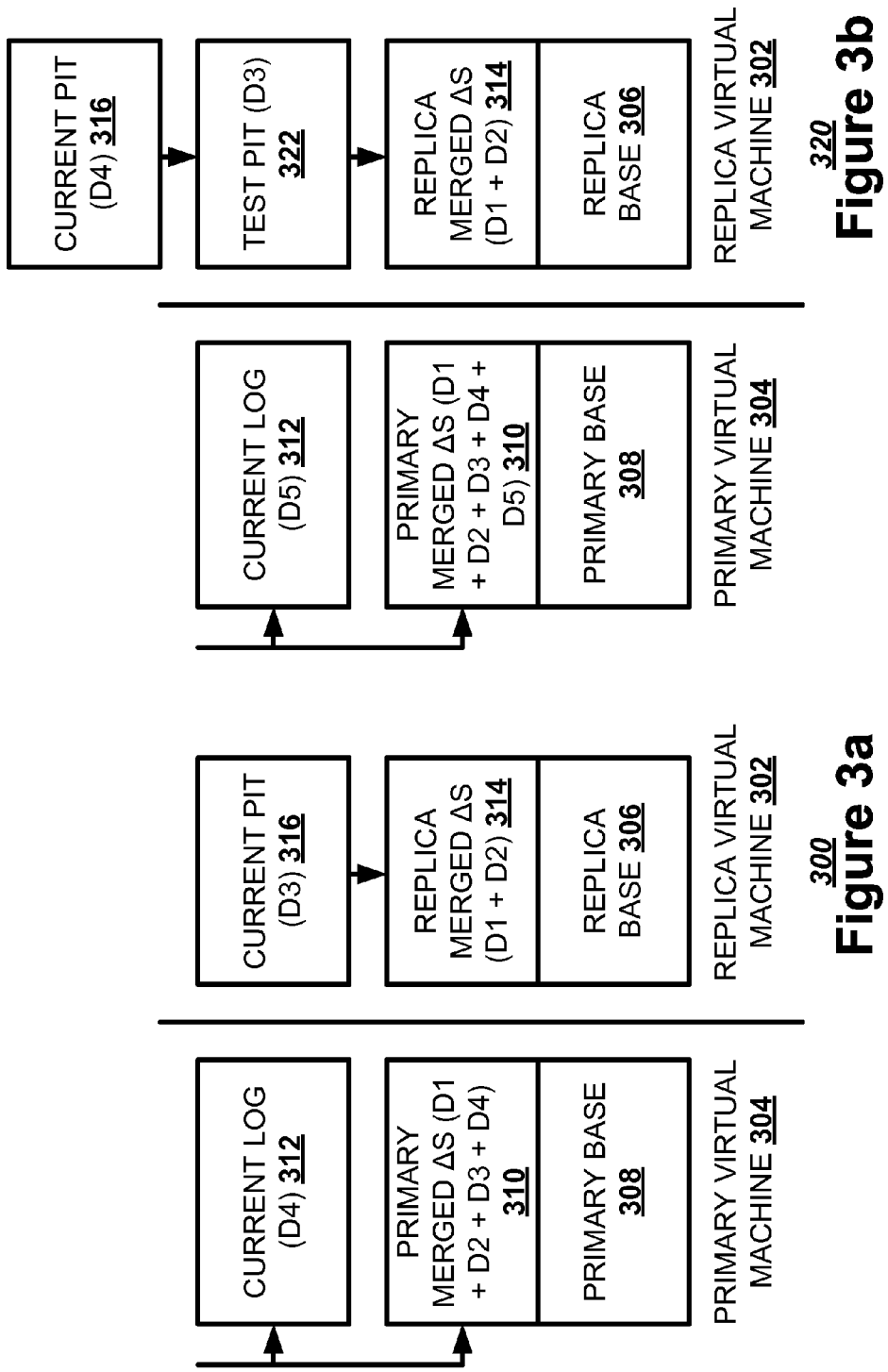

340

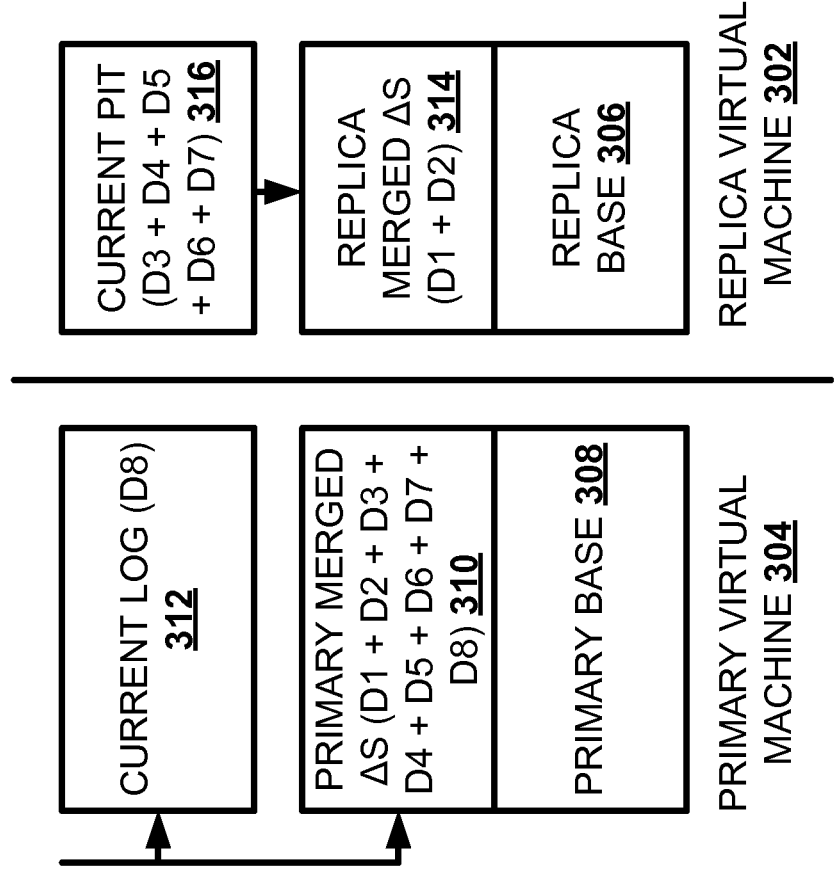

400

RELIABLY TESTING VIRTUAL MACHINE FAILOVER USING DIFFERENCING DISKS

BACKGROUND

A primary virtual machine running production workloads on a primary server may maintain a replica virtual machine mirroring the primary virtual machine to act as a failsafe, either at the same site or at a different location. The replica virtual machine may import any changes made to the primary virtual machine. If the primary virtual machine fails, the replica virtual machine may substitute in to run the production workload of the primary machine, in a process referred to as a "failover".

SUMMARY

This Summary is provided to introduce a selection of concepts in a simplified form that is further described below in the Detailed Description. This Summary is not intended to identify key features or essential features of the claimed subject matter, nor limit the scope of the claimed subject matter.

Embodiments discussed below relate to testing a replica data set while continuing to replicate a primary data set. A data storage may store a replica data set for a replica virtual machine to back up a primary data set for a primary virtual machine. The data storage may preserve a test point in time in the replica data set using a test differencing disk. A processor may execute a test virtual machine that performs a test operation on the test point in time while the replica data set continues to replicate the primary data set.

DRAWINGS

In order to describe the manner in which the above-recited and other advantages and features can be obtained, a more particular description is set forth and will be rendered by reference to specific embodiments thereof which are illustrated in the appended drawings. Understanding that these drawings depict only typical embodiments and are not therefore to be considered to be limiting of its scope, implementations will be described and explained with additional specificity and detail through the use of the accompanying drawings.

FIGS. 3a-e illustrate, in block diagrams, embodiments of virtual machine replication system phases.

Figure 4:
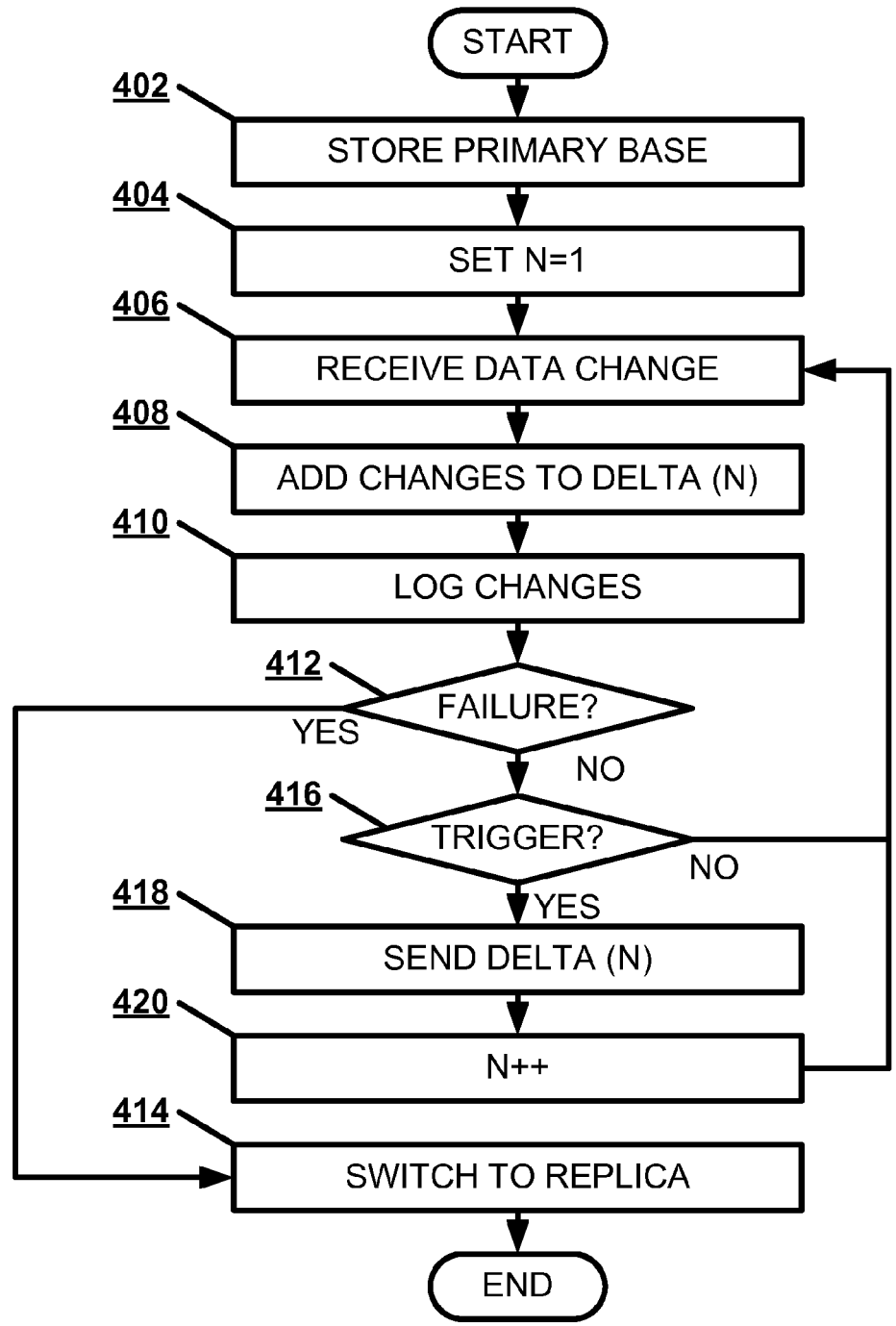

FIG. 4 illustrates, in a flowchart, one embodiment of a method for sending replication updates from a primary virtual machine.

Figure 5:
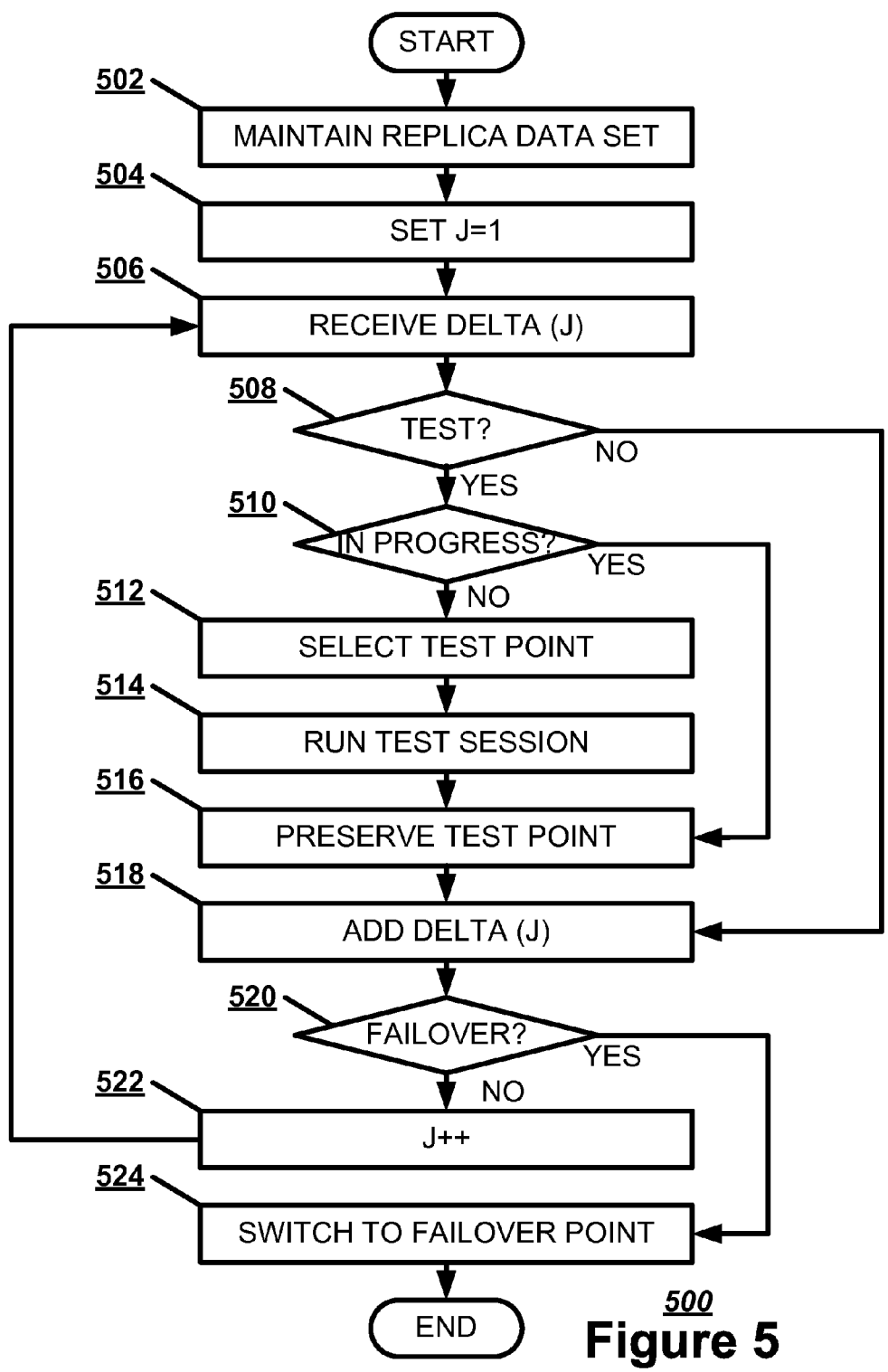

FIG. 5 illustrates, in a flowchart, one embodiment of a method for receiving replication updates in a replica virtual machine.

Figure 6:
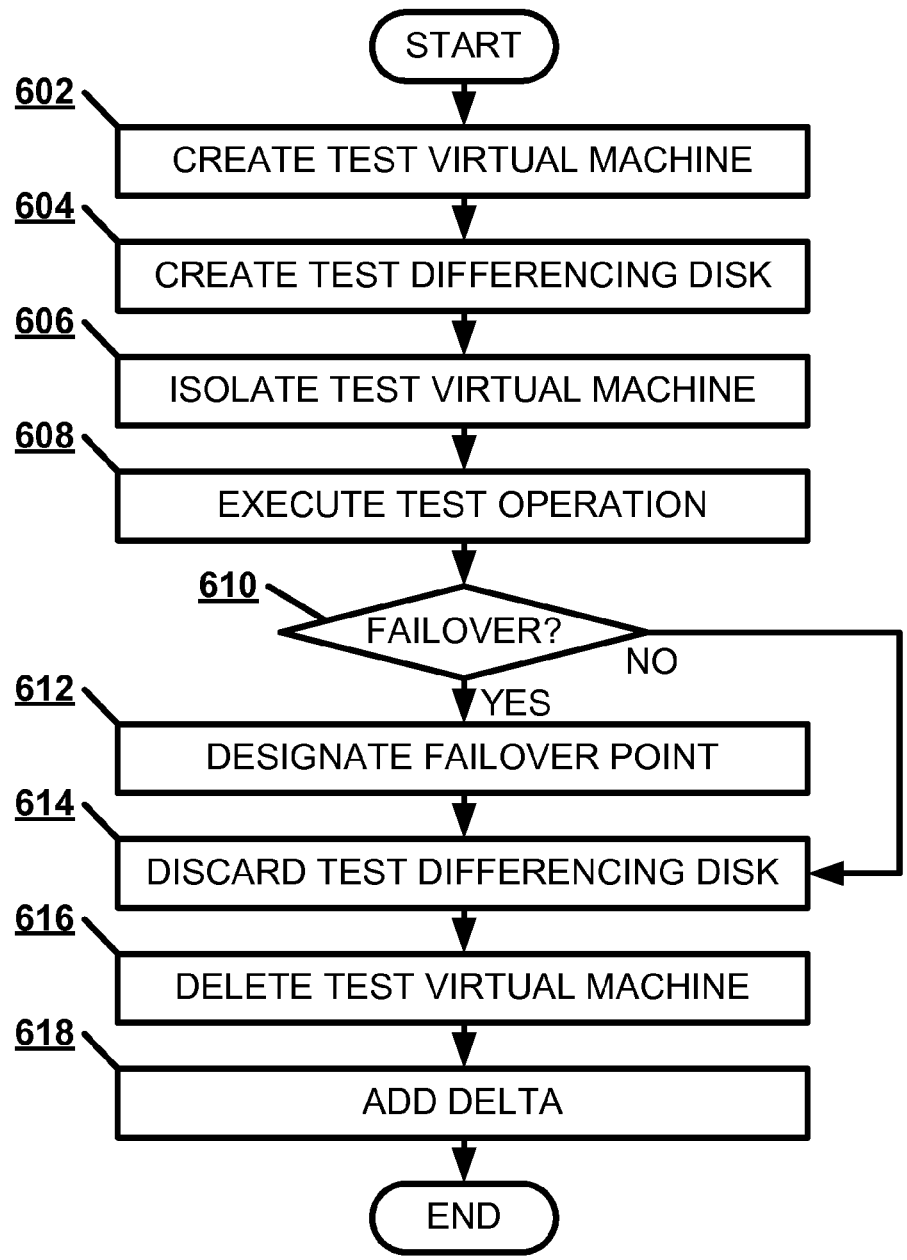

FIG. 6 illustrates, in a flowchart, one embodiment of a method for executing a test session on a replica virtual machine.

DETAILED DESCRIPTION

Embodiments are discussed in detail below. While specific implementations are discussed, this is done for illustration purposes. A person skilled in the relevant art will recognize that other components and configurations may be used without parting from the spirit and scope of the subject matter of this disclosure. The implementations may be a machine-implemented method, a tangible computer-readable medium having a set of instructions detailing a method stored thereon for at least one processor, or a virtual machine replication system.

Setting up a disaster recovery solution may be a one-time job that works as an insurance plan for a production workload of a server. Although a replication solution may indicate that a replica virtual machine on a recovery site is ready for failover, an administrator may want to ascertain if the replica virtual machine may replace the production workloads in case the primary server goes down. The virtual machine replication system may perform a planned failover on the recovery site and verify the setup. However, performing an actual planned failover may be inherently expensive due to the process of failover and returning the processes to the primary virtual machine, referred to as "failback". Failover and failback may create downtime for the production workload of the primary virtual machine, or primary workload, and its replication.

Alternately, the virtual machine replication system may simulate a failover in a test environment. Such a simulation may allow a replica virtual machine and any associated replica data sets to continue to receive updates to match changes to a primary data set associated with the primary virtual machine. The virtual machine replication may use differencing disks to perform the simulation. A differencing disk creates one or more images of a virtual data set at various points in time. The differencing disk may be used to perform a test operation on a specified data view, referred to as a "point in time", without modifying the underlying virtual data set.

A virtual machine replication system may use differencing disks to reduce production workload downtime to avoid shutting down the workload. Any testing of the replica virtual machine may occur while the primary virtual machine is still operating normally. The differencing disks may be used to create a test point in time modeling the replica data set for the purposes of a failover test.

The virtual machine replication system may use differencing disks to reduce replication downtime to avoid a backlog of data. The usage of differencing disks may preserve the data view as a test point in time for the test virtual machine enabling replication to continue by updating the top of the virtual machine hard disk chain.

The virtual machine replication system may use differencing disks to reduce duplication of large amounts of data. The differencing disks may be discarded once the simulation is complete, automatically purging any data generated as part of the simulation. The test virtual machine may also be discarded post testing, eliminating any foot print of the test failover process on the recovery server.

The virtual machine replication system may use differencing disks to achieve isolation of the data testing from the operation of the primary virtual machine. The test failover process may expose exactly the same set of options present in failover flow. The test failover process may inject a guest internet protocol address, select a failover point in time from recovery history, and pre-configure a test failover network for isolation. Additionally, the test virtual machine may be an exact copy of the replica virtual machine, with the exception of the virtual hard disks. The test virtual machine may be connected to the test network specified by the administrator on every simulation and not connected to the production network. The internet protocol address configured for failover may be injected into the test virtual machine to ensure the failover simulation honors any hard bindings of the workloads to the internet protocol addresses.

Thus, in one embodiment, a virtual machine replication system may test a replica data set while continuing to replicate a primary data set. A data storage may store a replica data set for a replica virtual machine to back up a primary data set for a primary virtual machine. The data storage may preserve a test point in time in the replica data set using a test differencing disk. A processor may execute a test virtual machine that performs a test operation on the test point in time while the replica data set continues to replicate the primary data set.

Figure 1:
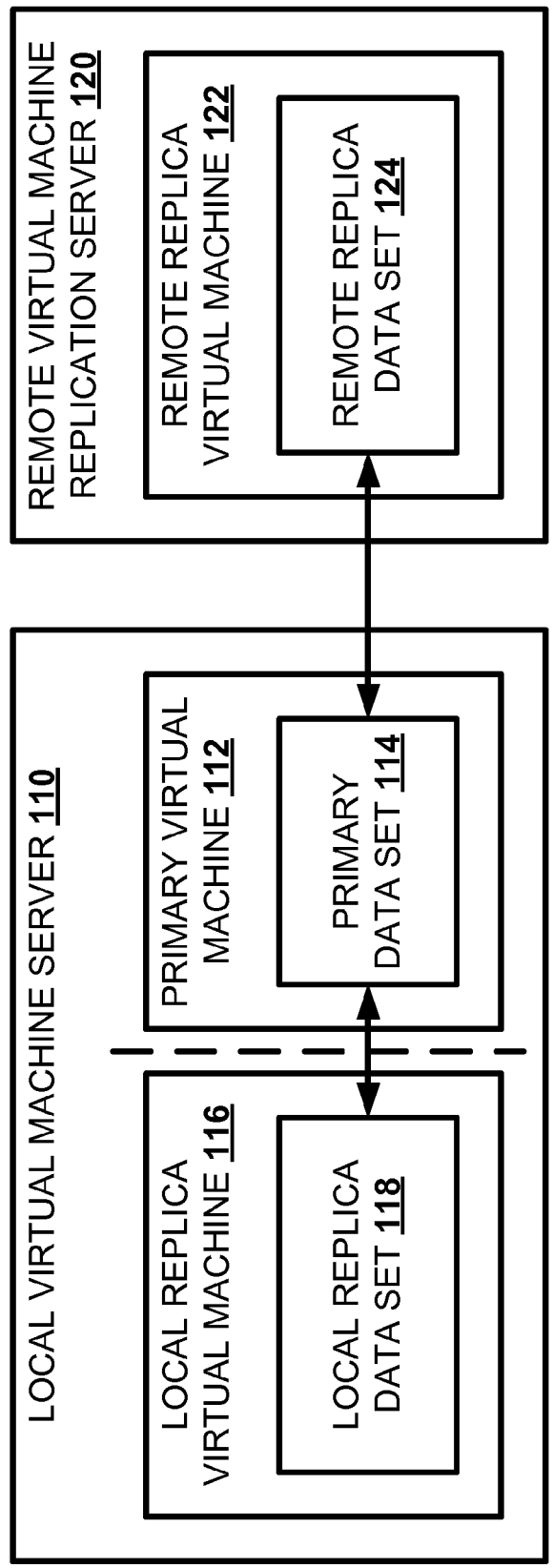
FIG. 1 illustrates, in a block diagram, one embodiment of a redundant virtual machine backup layout.

FIG. 1 illustrates, in a block diagram, one embodiment of a redundant virtual machine backup layout 100. A local virtual machine server 110 may host a primary virtual machine 112 that maintains a primary data set 114. The local virtual machine server 110 may have a local back up of the primary virtual machine 112 using a local replica virtual machine 116 that maintains a local replica data set 118. The local replica virtual machine 116 may match the functions of the primary virtual machine 112. The local replica data set 118 may match the primary data set 114 at various points in time. Thus, if the primary data set 114 becomes corrupted, the local replica virtual machine 116 may use a version of the local replica data set 118 that predates the corrupting update.

For more robust protection, a remote virtual machine replication server 120 may back up the local virtual machine server 110, allowing the remote virtual machine replication server 120 to take over if the local virtual machine server 110 becomes damaged. The remote virtual machine replication server 120 may have a remote replica virtual machine 122 that maintains a remote replica data set 124. The remote replica virtual machine 122 may match the functions of the primary virtual machine 112. The remote replica data set 124 may match the primary data set 114 at various points in time.

Figure 2:
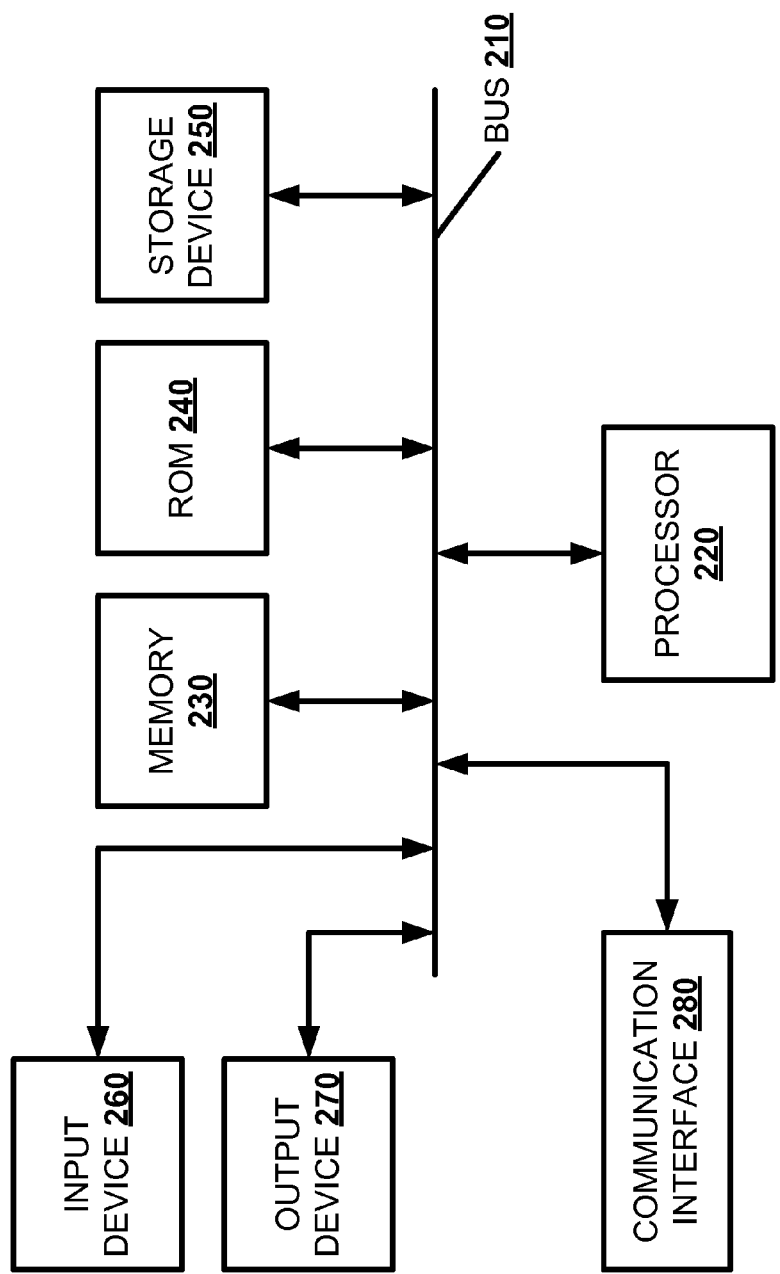
FIG. 2 illustrates, in a block diagram, one embodiment of a computing device.

FIG. 2 illustrates a block diagram of an exemplary computing device 200 which may act as a virtual machine system. The computing device 200 may combine one or more of hardware, software, firmware, and system-on-a-chip technology to implement a virtual machine system. The computing device 200 may include a bus 210, a processor 220, a memory 230, a read only memory (ROM) 240, a data storage 250, an input device 260, an output device 270, and a communication interface 280. The bus 210, or other component interconnection technology, may permit communication among the components of the computing device 200.

The processor 220 may include at least one conventional processor or microprocessor that interprets and executes a set of instructions. The memory 230 may be a random access memory (RAM) or another type of dynamic storage device that stores information and instructions for execution by the processor 220. The memory 230 may also store temporary variables or other intermediate information used during execution of instructions by the processor 220. The ROM 240 may include a conventional ROM device or another type of static storage device that stores static information and instructions for the processor 220. The data storage 250 may include any type of tangible computer-readable medium, such as, for example, magnetic or optical recording media, such as a digital video disk, and its corresponding drive. A tangible computer-readable medium is a physical medium storing machine-readable code or instructions, as opposed to a signal. Having instructions stored on a computer-readable media as described herein is distinguishable from having instructions propagated or transmitted, as the propagation transfers the instructions, versus stores the instructions such as can occur with a computer-readable medium having instructions stored thereon. Therefore, unless otherwise noted, references to computer-readable media/medium having instructions stored thereon, in this or an analogous form, references tangible media on which data may be stored or retained. The data storage 250 may store a set of instructions detailing a method that when executed by one or more processors cause the one or more processors to perform the method. The data storage 250 may also be a database or a database interface. The data storage 250 may be partitioned to isolate a local replica virtual machine 116 from a primary virtual machine 112.

The input device 260 may include one or more conventional mechanisms that permit a user to input information to the computing device 200, such as a keyboard, a mouse, a voice recognition device, a microphone, a headset, a gesture recognition device, a touch screen, etc. The output device 270 may include one or more conventional mechanisms that output information to the user, including a display, a printer, one or more speakers, a headset, or a medium, such as a memory, or a magnetic or optical disk and a corresponding disk drive. The communication interface 280 may include any transceiver-like mechanism that enables computing device 200 to communicate with other devices or networks. The communication interface 280 may include a network interface or a transceiver interface. The communication interface 280 may be a wireless, wired, or optical interface. The communication interface may send or receive any data updates between a local virtual machine server 110 and a remote virtual machine replication server 120.

The computing device 200 may perform such functions in response to processor 220 executing sequences of instructions contained in a computer-readable medium, such as, for example, the memory 230, a magnetic disk, or an optical disk. Such instructions may be read into the memory 230 from another computer-readable medium, such as the storage device 250, or from a separate device via the communication interface 280.

A virtual machine replication system may use a test differencing disk to run a test session on replica virtual machine. FIG. 3a illustrates, in a block diagram, one embodiment of a virtual machine replication system in a pretest phase 300. A replica virtual machine 302 may sync with a primary virtual machine 304. The replica virtual machine 302 may maintain a replica base data set 306 that matches the primary base data set 308 maintained by the primary virtual machine 304.

The replica virtual machine 302 may periodically synchronize with the primary virtual machine 304, receiving changes to the primary base data set 308, referred to as delta data subsets, at various intervals. The primary virtual machine 304 may send a delta data subset when triggered by a delta trigger. The delta trigger may be a temporal trigger, causing the delta data subsets to be sent at periodic intervals. Alternatively, a delta trigger may be event driven, such as the size of the delta data subset or by the type of data changed. The primary virtual machine 304 may add each delta data subset to the primary base data set 308 as part of the primary merged delta data subsets 310. For example, the primary virtual machine 304 may add delta data subsets D1, D2, D3, and D4 to the primary merged delta data subset 310. The primary virtual machine 304 may track in a current log 312 any change since the last delta data subset was sent to the replica virtual machine 302. For example, the current log 312 may track any changes included in delta data subset D4.

The replica virtual machine 302 may add any delta data subset received from the primary virtual machine 304 to the replica base data set 306 as part of the replica merged delta data subsets 314. For example, the replica virtual machine 302 may add delta data subsets D1 and D2 to the replica merged delta data subset 314. The replica virtual machine 302 may use differencing disks to maintain recently received delta data subsets as a current point in time (PIT) 316. For example, the current point in time 316 may reference delta data subset D3.

An administrator may then simulate a failover to test the replica virtual machine 302. FIG. 3b illustrates, in a block diagram, one embodiment of a virtual machine replication system in a preservation phase 320. In this example, the primary merged delta data subset 310 may now have delta data subsets D1, D2, D3, D4, and D5. The current log 312 may now be tracking delta data subset D5.

The replica virtual machine 302 may generate a differencing disk to preserve a data view for a test virtual machine, referred to as a test point in time (PIT) 322. In this example, the test point in time 322 may be delta data subset D3. The replica virtual machine 302 may apply subsequent delta data subsets from the primary virtual machine 304 to the top of a virtual hard disk chain, leaving the test point in time 322 unaffected. Thus, in this example, the current point in time may be delta data subset D4.

Figure 3C:
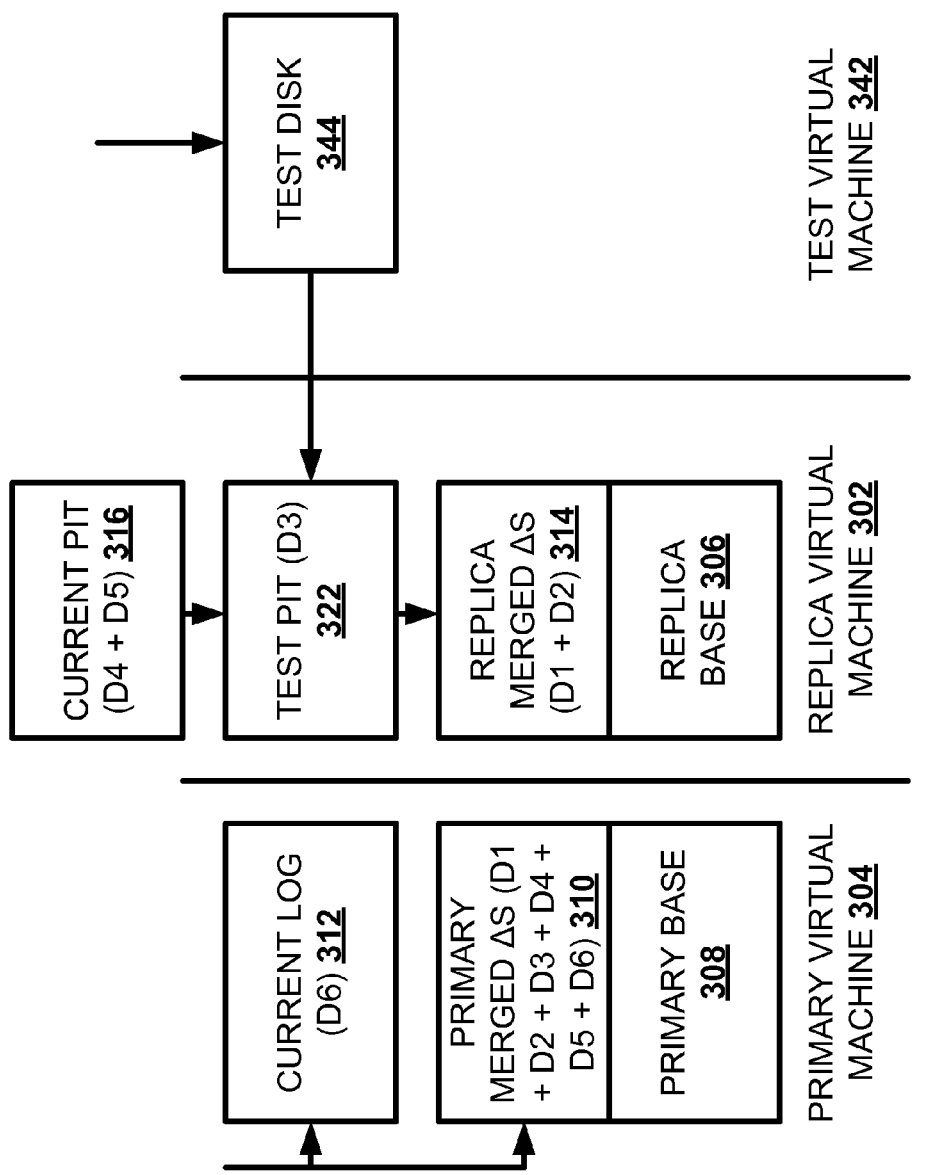

FIG. 3c illustrates, in a block diagram, one embodiment of a virtual machine replication system in an instantiation phase 340. The virtual machine replication system may create a test virtual machine 342 using a copy of the configuration of the replica virtual machine 302. The test virtual machine 342 may update a configuration of a test differencing disk 344 to point to the test point in time 322 of the replica virtual machine 302. The test differencing disk 344 may capture any write operations originating within the test virtual machine 342. The test differencing disk 344 may prevent these write operations from being written to a replica data set, allowing the virtual machine replication system to forgo any copying of the replica data set.

The replication process may remain unaffected during the test process. The replica virtual machine 302 may continue to receive and apply delta data subsets from the primary virtual machine 304. In this example, the primary merged delta data subset 310 may now have delta data subsets D1, D2, D3, D4, D5, and D6. The current log 312 may now be tracking delta data subset D6. The current point in time for the replica data set may be delta data subsets D4 and D5.

The virtual machine replication system may update the configuration of the test virtual machine 342 based on a set of failover settings specified by an administrator, connecting the test virtual machine to the specified test network to enable the administrator to achieve network isolation. The test network selection for each network adapter may be in the form of a network resource pool or a virtual network switch.

The virtual machine replication system may stage in the configuration of the test virtual machine 342 the internet protocol (IP) address configured for failover in the replica virtual machine 302. Then, the test virtual machine 342 may power up. On power up, integration services running within the test virtual machine 342 may configure the internet protocol address as specified in the configuration. At this point, the test virtual machine 342 may perform user and workload specific simulation of the failover in an isolated manner.

Figure 3D:
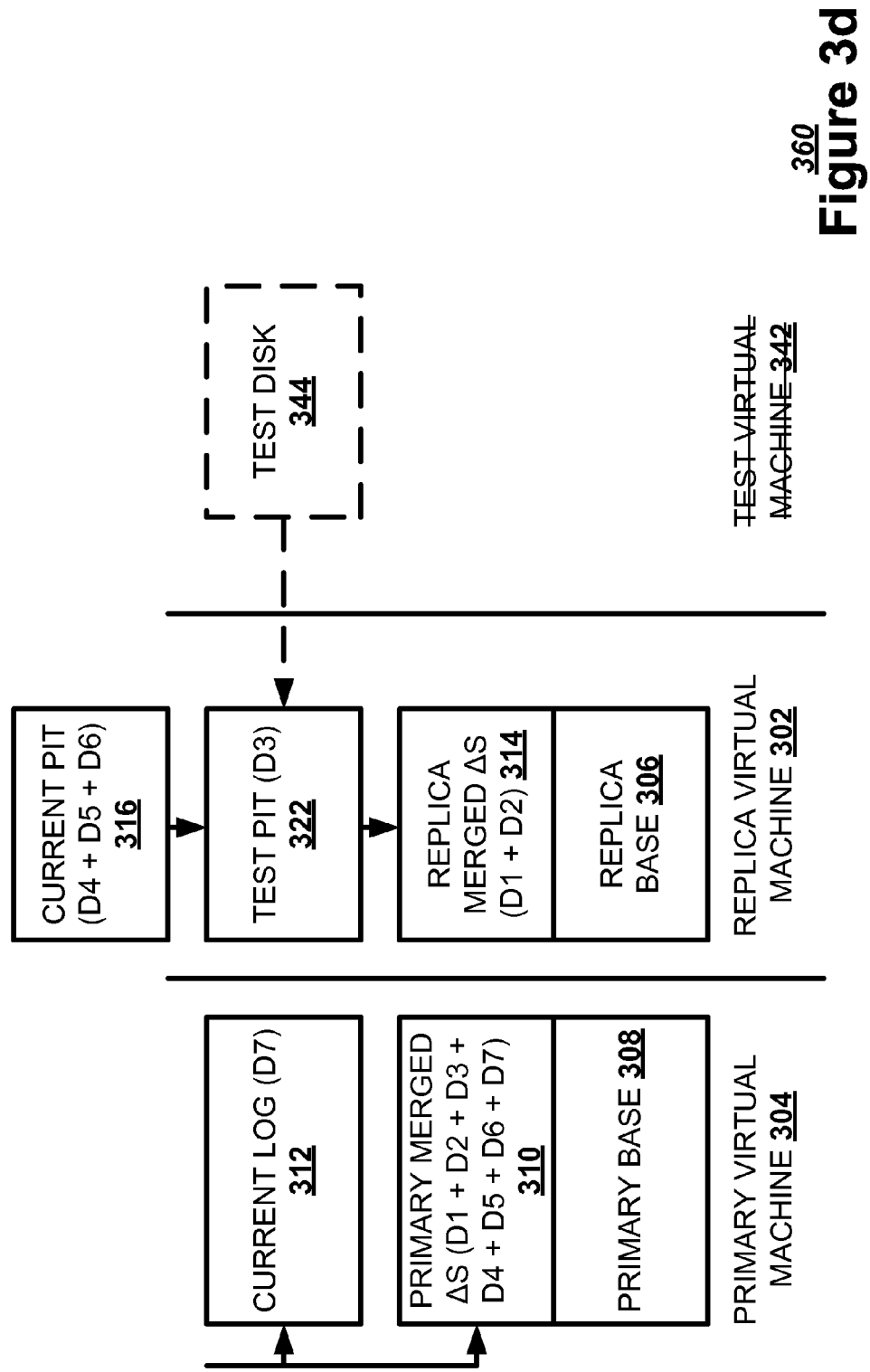

FIG. 3d illustrates, in a block diagram, one embodiment of a virtual machine replication system in a clean up phase 360. Once the simulation is complete, the virtual machine replication system may delete the configuration of the test virtual machine 342. The virtual machine replication system may delete the test differencing disk 344 generated to capture the writes from the test virtual machine 342. In this example, the primary merged delta data subset 310 may now have delta data subsets D1, D2, D3, D4, D5, D6, and D7. The current log 312 may now be tracking delta data subset D7. The current point in time for the replica data set may be delta data subsets D4, D5, and D6.

FIG. 3e illustrates, in a block diagram, one embodiment of a virtual machine replication system in a resumption phase 380. The virtual machine replication system may release the test point in time 322 and delete the differencing disk for the test point in time 322. The virtual machine replication system may merge the data present in that delta data subset into the parent disk. Replication may remain unaffected, continuing to write to the top of the replica data set as before. In this example, the primary merged delta data subset 310 may now have delta data subsets D1, D2, D3, D4, D5, D6, D7, and D8. The current log 312 may now be tracking delta data subset D8. The current point in time for the replica data set may be delta data subsets D3, D4, D5, D6, and D7.

FIG. 4 illustrates, in a flowchart, one embodiment of a method 400 for sending replication updates from a primary virtual machine 304. The primary virtual machine 304 may store a primary base data set 308 (Block 402). The primary virtual machine 304 may set a primary delta data subset index N to 1 (Block 404). The primary virtual machine 304 may receive a data change to the primary data set (Block 406). The primary virtual machine 304 may add the data change to the delta data subset (Block 408). The primary virtual machine 304 may log the data change in the current log 312 (Block 410). If a data failure occurs (Block 412), the primary virtual machine 304 may switch operations over to the replica virtual machine 302 (Block 414). Alternately, a user may initiate switching operations over to the replica virtual machine 302 if a data failure occurs. If a delta trigger occurs (Block 416), the primary virtual machine 304 may send a delta data subset to the replica virtual machine 302 (Block 418). The primary virtual machine 304 may increment the primary delta data subset index N (Block 420).

FIG. 5 illustrates, in a flowchart, one embodiment of a method 500 for receiving replication updates in a replica virtual machine 302. The virtual machine server may maintain a replica data set for a replica virtual machine 302 to back up a primary data set for a primary virtual machine 304 (Block 502). The virtual machine server may set a replica delta data subset index J to 1 (Block 504). The virtual machine server may receive a delta data subset for the replica data set replicated from the primary data set while preserving a test point in time (Block 506). If the administrator wants to test the replica virtual machine 302 (Block 508), and a test session is not in progress (Block 510), the virtual machine server may select a test point in time from a point in time option set (Block 512). The virtual machine server may run a test session on the replica data set with a test virtual machine 342 while the replica data set continues to replicate the primary data set (Block 514). The virtual machine server may preserve the test point in time in the replica data set for a test virtual machine 342 to execute a test operation using a test differencing disk 344 to avoid causing data duplication (Block 516). By using a test differencing disk 344, the virtual machine server may avoid duplicating the replica data set for the purpose of testing the replica data set. The virtual machine server may add a delta data subset to the replica data set received from the primary data set (Block 518). If no failover occurs (Block 520), the virtual machine server may increment the replica delta data subset index J (Block 522). If a failover occurs (Block 520), the virtual machine server may switch to a designated failover point (Block 524).

FIG. 6 illustrates, in a flowchart, one embodiment of a method 600 for executing a test on a replica virtual machine 302. The virtual machine server may create a test virtual machine 342 to model the replica virtual machine 302 (Block 602). The virtual machine server may create a test differencing disk 344 referencing a test point in time (Block 604). The virtual machine server may isolate the test virtual machine 342 from a primary workload of the primary virtual machine 304 (Block 606). By isolating the test virtual machine, the primary workload of the primary virtual machine 304 may avoid being impacted by the test failover. The virtual machine server may execute a test operation on a test point in time in the replica data set with a test virtual machine 342 while the replica data set continues to replicate primary data set (Block 608). If the test operation indicates that the test point in time may be useful as a failover point in time (Block 610), the virtual machine server may designate the test point in time as a failover point in time based on the test operation (Block 612). The virtual machine server may discard the test differencing disk upon completion of the test operation (Block 614). The virtual machine server may delete the test virtual machine upon completion of the test operation (Block 616). The virtual machine server may add a delta data subset to the replica data set received from the primary data set (Block 618).

Although the subject matter has been described in language specific to structural features and/or methodological acts, the subject matter in the appended claims is not necessarily limited to the specific features or acts described above. Rather, the specific features and acts described above are disclosed as example forms for implementing the claims.

Embodiments within the scope of the present invention may also include non-transitory computer-readable storage media for carrying or having computer-executable instructions or data structures stored thereon. Such non-transitory computer-readable storage media may be any available media that can be accessed by a general purpose or special purpose computer. By way of example, and not limitation, such non-transitory computer-readable storage media can comprise RAM, ROM, EEPROM, CD-ROM or other optical disk storage, magnetic disk storage or other magnetic storage devices, or any other medium which can be used to carry or store desired program code means in the form of computer-executable instructions or data structures. Combinations of the above should also be included within the scope of the non-transitory computer-readable storage media.

Embodiments may also be practiced in distributed computing environments where tasks are performed by local and remote processing devices that are linked (either by hardwired links, wireless links, or by a combination thereof) through a communications network.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, objects, components, and data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Although the above description may contain specific details, they should not be construed as limiting the claims in any way. Other configurations of the described embodiments are part of the scope of the disclosure. For example, the principles of the disclosure may be applied to each individual user where each user may individually deploy such a system. This enables each user to utilize the benefits of the disclosure even if any one of a large number of possible applications do not use the functionality described herein. Multiple instances of electronic devices each may process the content in various possible ways. Implementations are not necessarily in one system used by all end users. Accordingly, the appended claims and their legal equivalents should only define the invention, rather than any specific examples given.

We claim:

1. A machine-implemented method, comprising:
   maintaining a replica data set for a replica virtual machine to back up a primary data set for a primary virtual machine; and
   executing a test operation on the replica data set with a test virtual machine while the replica data set continues to replicate the primary data set.

2. The method of claim 1, further comprising:
   preserving a test point in time in the replica data set for the test virtual machine to execute the test operation while avoiding causing data duplication.

3. The method of claim 1, further comprising:
   creating the test virtual machine to model the replica virtual machine.

4. The method of claim 1, further comprising:
   deleting the test virtual machine upon completion of the test operation.

5. The method of claim 1, further comprising:
   receiving a delta data subset for the replica data set replicated from the primary data set while preserving a test point in time.

6. The method of claim 1, further comprising:
   adding a delta data subset to the replica data set received from the primary data set.

7. The method of claim 1, further comprising:
   isolating the test virtual machine from a primary workload of the primary virtual machine.

8. The method of claim 1, further comprising:
   selecting a test point in time from a point in time option set.

9. The method of claim 1, further comprising:
   designating a failover point in time based on the test operation.

10. A tangible computer-readable medium having a set of instructions detailing a method stored thereon that when executed by one or more processors cause the one or more processors to perform the method, the method comprising:
    maintaining a replica data set for a replica virtual machine to back up a primary data set for a primary virtual machine;
    preserving a test point in time in the replica data set using a test differencing disk; and
    executing a test operation on the test point in time with a test virtual machine.

11. The tangible computer-readable medium of claim 10, wherein the method further comprises:
    discarding the test differencing disk upon completion of the test operation.

12. The tangible computer-readable medium of claim 10, wherein the method further comprises:
    creating the test virtual machine to model the replica virtual machine.

13. The tangible computer-readable medium of claim 10, wherein the method further comprises:
    deleting the test virtual machine upon completion of the test operation.

14. The tangible computer-readable medium of claim 10, wherein the method further comprises:

receiving a delta data subset for the replica data set replicated from the primary data set while preserving a test point in time.

15. The tangible computer-readable medium of claim 10, wherein the method further comprises:

adding a delta data subset to the replica data set received from the primary data set.

16. The tangible computer-readable medium of claim 10, wherein the method further comprises:

isolating the test virtual machine from a primary workload of the primary virtual machine.

17. The tangible computer-readable medium of claim 10, wherein the method further comprises:

designating a failover point in time based on the test operation.

18. A virtual machine replication server, comprising:

a data storage that stores a replica data set for a replica virtual machine to back up a primary data set for a primary virtual machine and preserves a test point in time in the replica data set using a test differencing disk; and a processor that executes a test virtual machine that performs a test operation on the test point in time while the replica data set continues to replicate the primary data set.

19. The virtual machine replication server of claim 18, further comprising:

a communication interface that receives a delta data subset for the replica data set replicated from the primary data set while preserving the test point in time.

20. The virtual machine replication server of claim 18, wherein the processor designates a failover point in time based on the test operation.

* * * * *